Nov. 20, 1934.  G. S. SCOTT  1,981,429
FISHING REEL
Filed Jan. 19, 1934
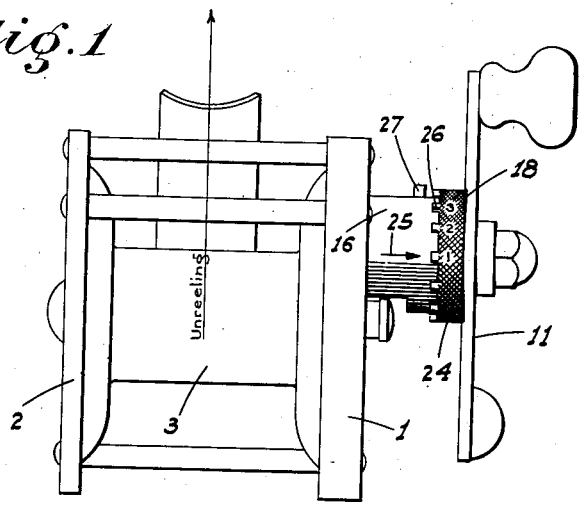
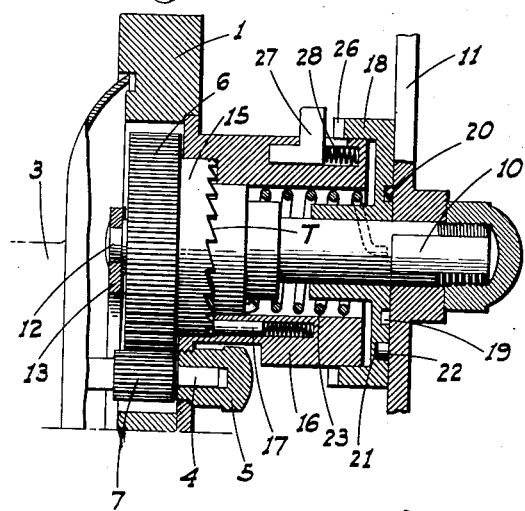
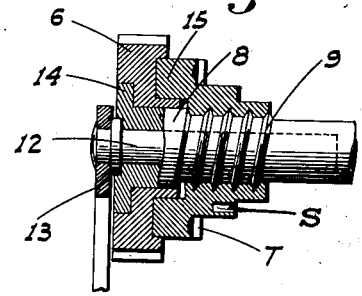
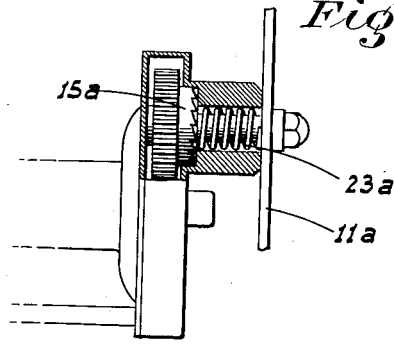
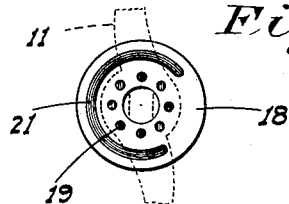
INVENTOR
G. S. Scott
BY
ATTORNEY Patented Nov. 20, 1934

1,981,429

UNITED STATES PATENT OFFICE 1,981,429

FISHING REEL

George S. Scott, Fresno, Calif.

Application January 19, 1934, Serial No. 707,241

8 Claims. (Cl. 242—84.5)

This invention relates to fishing reels and particularly represents improvements over and modifications of the structure shown in my copending application for patent, Serial No. 697,779, filed November 13, 1933.

The principal object of the present invention is to provide a means whereby a braking effect on the reel-spool as the line is pulled will be automatically obtained, without manipulation or holding of the handle being necessary. At the same time a slight movement of the handle in a certain direction will effect a complete release of the brake so that the spool may run free, and the releasing mechanism actuated by such movement of the handle may if desired be locked against retractive movement. In this manner the spool and line may run free without any handle manipulation, as when casting etc.

A further object of the invention is to provide means for easily and instantly adjusting the effectiveness of the braking action as conditions may require.

These objects I accomplish by means of such structure and relative arrangement of parts as will fully appear by a perusal of the following specification and claims.

In the drawing similar characters of reference indicate corresponding parts in the several views:

Figure 1 is a plan view of a reel equipped with my improved structure.

Figure 2 is an enlarged view of the reel control mechanism partly in section.

Figure 3 is a sectional view of the clutch or brake unit detached.

Figure 4 is a face view of the adjustable spring tension cap.

Figure 5 is a fragmentary view of a reel partly in section showing a modified braking arrangement.

Referring now more particularly to the characters of reference on the drawing, and particularly at present to Figures 1 to 4, the reel comprises a pair of transversely spaced heads 1 and 2 connected together in the usual manner and between which the reel spool 3 is disposed. The spindle 4 of the spool is turnably mounted in the head 2 in the customary manner while its opposite end is journaled in a bearing bushing 5 in the head 1.

Mounted in the head 1 between its outer face and the adjacent end of the spool is a gear 6, which constantly engages a pinion 7 fixed on the adjacent end of the spindle 4. The gear is turnably and slidably mounted on the adjacent portion of a sleeve 8 which outwardly of said gear is provided with left hand threads 9 for a certain portion of its length. Beyond the threaded portion the sleeve projects clear of the head and has a reduced portion 10 arranged to non-turnably project into the hub of the usual crank handle bar 11 of conventional form.

The sleeve 8 is turnably mounted on a spindle 12 which at its inner end is rigidly fixed on a member 13 secured to the inner face of the head 1. The sleeve 8 behind the gear is formed with a disc 14 to frictionally engage the adjacent face of the gear. Threaded on the screw 9 is a conventional ratchet and friction element 15 disposed outwardly of the gear to engage and cooperate with the same in frictional gripping relation.

The element 15 projects into and turnably engages a tubular housing 16 which is rigid with and projects outwardly from the head 1, said housing terminating short of the handle bar 11. The ratchet teeth T of said element face outwardly or away from the gear and are engaged by a spring pressed pawl 17 mounted in the housing for movement lengthwise thereof. The teeth on the element are arranged to prevent advancing rotation of the same along the threads 9 except for the arcuate amount between adjacent teeth.

Turnably mounted on the sleeve 8 and extending over the outer end of the housing is a cap 18, capable of a certain amount of movement toward the housing as shown in Figure 2. The outer face of the cap has a circumferential row of sockets 19 to engage a nub 20 projecting from the hub of the bar 11, the length of the nub being less than the possible axial movement of the cap. The cap also has a segmental circumferential groove 21 in its outer face in which a pin 22 on the bar 11 rides, the length of said pin being greater than the possible axial movement of the cap.

Disposed in the housing about the sleeve and extending between the element 15 and the cap is a conventional torque and compression spring 23. The spring 23 is secured at one end to the cap and at its other end engages a suitable socket S in element 15. This spring is arranged so that the torque action is increased by a rotation of the cap about the sleeve in an anti-clockwise direction. The rim flange of the cap which overhangs the housing is knurled as at 24 so as to be readily turned by the fingers and is provided with circumferentially spaced numbers which read against a mark on the housing as at 25. This enables the operator to accurately adjust the cap to give any desired and predetermined degree of spring tension.

Such adjustment is effected by pressing the cap against the housing, which clears the nub 20 from any socket 19 but does not clear the pin 22 from the groove 21; and rotating the cap to the left the desired amount as determined by the numbers on the cap and the mark 25. The cap is then released and the spring 23 forces the same out so that the nub 20 engages another socket and the cap and handle bar are again locked together. The purpose of the groove 21 and its cooperating pin is to limit the possible amount of rotation of the cap relative to the handle bar and sleeve, so as to prevent possible over-tensioning and breaking of the spring.

Projecting from the inner edge of the cap flange are circumferentially spaced lugs 26 between any of which a finger actuated pawl 27 may be disposed. This pawl is mounted in the housing for movement lengthwise thereof and projects radially therefrom, being normally held back of the lugs a sufficient distance to allow of advancing movement and rotation of the cap by a suitable spring 28.

By reason of the above described structure it will be seen that the spring 23 exerts a constant tendency to rotate the friction element 15 and advance the same along the screw sleeve. It can only do this however sufficient to bring the element 15 and the gear 6 into firm frictional engagement, since the pawl and ratchet device prevent other than a very small movement of the element in that direction. At the same time of course the gear 6 is forced along the sleeve so that it is brought into firm engagement with the friction disc 14.

Unwinding rotation of the spool 3 as by the pull of a fish on the line therefore is restrained by the braking pressure applied against the gear, which is engaged by the spool pinion. After the cap is adjusted as previously described to increase the tension of the spring, the advancing action on the friction element will be more pronounced and a greater braking pressure will be obtained.

Rotation of the handle in a clockwise direction, as the gear resists such rotation, advances the friction element 15 farther along the sleeve into positive clamping engagement with the gear and allows the line to be wound onto the spool against the resistance of a fish pulling on the line.

When it is desired to allow the spool and line to run free it is only necessary to turn the handle slightly in a counter-clockwise direction, which turns the sleeve 8 so that the friction element 15 is moved lengthwise and retracted from the gear, even though the tension of the spring 23 is being increased by such turning of the handle and cap 18 which is locked thereto. In considering the different movements of the friction element and gear it must be remembered that they are made to work within very close limits and but very slight movements in one direction or the other are necessary to effect the desired result. If desired the spool may be retained in a free running condition without keeping a pressure on the handle, by advancing the pawl 27 in front of the adjacent cap lug 26, the spring action tending to return the cap to its normal position preventing the pawl from being released by its relatively weak spring 28.

The structure in Figure 5 is essentially the same as above described but is of a cheaper and simpler nature. In this case the spring 23a is compressive only and extends between and bears against the ratchet and friction element 15a and the handle bar 11a without being connected thereto, so that no tensional adjustment of the spring is possible and it merely exerts a constant pressure against the element 15a.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A fishing reel comprising a reel spool, a pinion mounted axially therewith, a gear engaging the pinion, a friction element cooperating with the gear, a spring acting to force the element into frictional engagement with the gear, handle actuated means to release the element from such frictional contact, and means to adjust the effective tension of the spring.

2. A fishing reel comprising a reel spool, a pinion mounted axially therewith, a gear engaging the pinion, a friction element cooperating with the gear, a spring acting to force the element into frictional engagement with the gear, handle actuated means to release the element from such frictional contact, and means to maintain said handle actuated means in a release position.

3. A fishing reel comprising a reel spool, a pinion mounted axially therewith, a gear engaging the pinion, a turnable sleeve on which said gear is freely turnable, a turning handle bar on the outer end of the sleeve, a friction element to engage the outer face of the gear threaded on the sleeve whereby said element will be moved along the sleeve by the rotation of the latter, means preventing rotation of the element in one direction, and a compression spring about the sleeve between the element and handle bar.

4. A fishing reel comprising a reel spool, a pinion mounted axially therewith, a gear engaging the pinion, a turnable sleeve on which said gear is freely turnable, a turning handle bar on the outer end of the sleeve, a friction element to engage the outer face of the gear threaded on the sleeve whereby said element will be moved along the sleeve by the rotation of the latter, means preventing rotation of the element in one direction, a member turnable on the sleeve between the element and handle bar and adjacent the latter, releasable means normally preventing rotation of the member relative to the bar, and a torque spring about the sleeve between and secured to said element and member and arranged to exert a rotative action on the element in said one direction, and to have an increased torque action with the rotation of the member on the sleeve in said direction.

5. A fishing reel comprising a reel spool, a pinion mounted axially therewith, a gear engaging the pinion, a turnable sleeve on which said gear is freely turnable, a turning handle bar on the outer end of the sleeve, a friction element to engage the outer face of the gear threaded on the sleeve whereby said element will be moved along the sleeve by the rotation of the latter, means preventing rotation of the element in one direction, a member turnable on the sleeve between the element and handle bar and locked to the latter, and a torque spring about the sleeve between and secured to the element and member and arranged to exert a rotative action on the element in said one direction and to be placed under increasing tension by a rotation of the member and bar in said direction.

6. A fishing reel comprising a reel spool, a pinion mounted axially therewith, a gear engaging the pinion, a turnable sleeve on which said gear is freely turnable, a turning handle bar on the outer end of the sleeve, a friction element to engage the outer face of the gear threaded on the sleeve whereby said element will be moved along the sleeve by the rotation of the latter, means preventing rotation of the element in one direction, a member turnable on the sleeve between the element and handle bar and locked to the latter, a torque spring about the sleeve between and secured to the element and member and arranged to exert a rotative action on the element in said one direction and to be placed under increasing tension by a rotation of the member and bar in said direction, and means actuable at will to hold the bar against retractive movement when thus rotated.

7. A fishing reel comprising a reel spool, a pinion mounted axially therewith, a gear engaging the pinion, a turnable sleeve on which said gear is freely turnable, a turning handle bar on the outer end of the sleeve, a friction element to engage the outer face of the gear threaded on the sleeve whereby said element will be moved along the sleeve by the rotation of the latter, means preventing rotation of the element in one direction, a member turnable on the sleeve between the element and handle bar and locked to the latter, a torque spring about the sleeve between and secured to the element and member and arranged to exert a rotative action on the element in said one direction and to be placed under increasing tension by a rotation of the member and bar in said direction, a fixed housing about the sleeve extending to adjacent the member, a flange on said member overhanging the housing and having circumferentially spaced lugs projecting therefrom, and a pawl mounted in the housing for movement lengthwise thereof and adapted to be shifted at will into position between any lugs.

8. A fishing reel comprising a reel spool, a pinion mounted axially therewith, a gear engaging the pinion, a turnable sleeve on which said gear is freely turnable, a turning handle bar on the outer end of the sleeve, a friction element to engage the outer face of the gear threaded on the sleeve whereby said element will be moved along the sleeve by the rotation of the latter, means preventing rotation of the element in one direction, a member turnable and slidable on the sleeve immediately behind the bar, said member having a row of sockets concentric with the sleeve, a nub projecting from the bar and engaging a socket, and a combination torque and compression spring about the sleeve between and secured to said element and member and arranged to both force the member against the bar and to exert a rotative advancing action on the element and to have an increased torque action with the rotation of the member in said one direction.

GEORGE S. SCOTT.